United States Patent
Kwon

(10) Patent No.: US 11,171,729 B2
(45) Date of Patent: Nov. 9, 2021

(54) TAG APPARATUS FOR ATTACHING THINGS BASED ON HUMAN BODY COMMUNICATION

(71) Applicant: DNX CO., LTD., Seoul (KR)

(72) Inventor: Eun Kyeong Kwon, Gwacheon-si (KR)

(73) Assignee: DNX CO., LTD., Seoul (KR)

( * ) Notice: Subject to any disclaimer, the term of this patent is extended or adjusted under 35 U.S.C. 154(b) by 0 days.

(21) Appl. No.: 16/587,251

(22) Filed: Sep. 30, 2019

(65) Prior Publication Data
US 2020/0328825 A1 Oct. 15, 2020

(30) Foreign Application Priority Data
Apr. 10, 2019 (KR) .................. 10-2019-0041923

(51) Int. Cl.
| H04B 13/00 | (2006.01) |
| H04B 5/00 | (2006.01) |
| G08B 13/04 | (2006.01) |
| G08B 13/22 | (2006.01) |
| H04Q 5/22 | (2006.01) |

(52) U.S. Cl.
CPC .......... *H04B 13/005* (2013.01); *H04B 5/0068* (2013.01)

(58) Field of Classification Search
CPC .... H04B 13/005; H04B 5/0068; H04B 13/00; H04B 5/0012; H04B 5/0056; G06K 19/07771; G06K 19/077; H01Q 1/22; H04Q 9/00; H04Q 5/22; H04Q 2209/47; G08B 13/04; G08B 13/22; E06B 5/00
See application file for complete search history.

(56) References Cited

U.S. PATENT DOCUMENTS

| 8,810,405 | B2 * | 8/2014 | Stevenson | A61N 1/37223 340/572.7 |
| 8,811,547 | B2 * | 8/2014 | Fazzi | H04B 13/005 375/343 |
| 9,515,391 | B2 * | 12/2016 | Hansen | H01Q 1/246 |
| 9,692,525 | B2 * | 6/2017 | Konanur | G06K 19/07756 |
| 9,792,465 | B2 * | 10/2017 | Tessier | G06K 7/0013 |
| 9,811,955 | B2 * | 11/2017 | Russell | G06Q 90/00 |

(Continued)

FOREIGN PATENT DOCUMENTS

| EP | 1626364 A2 * | 2/2006 | ............ H01Q 1/2216 |
| JP | 2008123468 A * | 5/2008 | |

(Continued)

*Primary Examiner* — Pablo N Tran
(74) *Attorney, Agent, or Firm* — Paratus Law Group, PLLC

(57) ABSTRACT

Disclosed is a tag apparatus for attaching things based on human body communication, including: a tag main body for human body communication configured to be attached to a thing to transmit identification information on a thing to a human body communication receiving device through human body communication during the contact of the human body with the thing; a case configured to protect the tag main body for human body communication; and a thing attachment portion configured to be exposed to an outside of the case to be attached to a particular part of the thing, detect when the human body contacts or approaches the thing, and forms a human body communication channel to output identification information on the thing.

4 Claims, 8 Drawing Sheets

(56) References Cited

U.S. PATENT DOCUMENTS

| | | | | |
|---|---|---|---|---|
| 2010/0045446 A1* | 2/2010 | Hyun | ............... | H04Q 9/00 340/10.51 |
| 2017/0220787 A1* | 8/2017 | Inokuchi | ............ | G06Q 10/10 |
| 2017/0358841 A1* | 12/2017 | Chen | ............. | H01Q 1/422 |

FOREIGN PATENT DOCUMENTS

| | | | | | |
|---|---|---|---|---|---|
| JP | 2011134233 | A | * | 7/2011 | |
| KR | 10-0912585 | B1 | | 8/2009 | |
| KR | 10-0942706 | B1 | | 2/2010 | |
| WO | WO-2007108371 | A1 | * | 9/2007 | ......... H01Q 1/248 |

* cited by examiner

TAG APPARATUS FOR ATTACHING THINGS BASED ON HUMAN BODY COMMUNICATION

CROSS-REFERENCE TO PRIOR APPLICATION

This application claims priority to Korean Patent Application No. 10-2019-0041923 (filed on Apr. 10, 2019), which is incorporated by reference in its entirety.

BACKGROUND

The present disclosure relates to a tag technology for attaching things based on human body communication, and more particularly, to a tag apparatus for attaching things based on human body communication capable of detecting a contact of a human body by simply attaching a tag to the things regardless of types sizes shapes areas and the like of the existing things and automatically collecting behavior situation information on contacted things by transmitting identification information on the things through human body communication as soon as a user's body contacts tag attachment portions of things.

Natural thing contact behavior in everyday life can be used as one of methods for identifying things or obtaining desired information on things in real time. That is, by contacting surrounding things, spatial information, behavior information, intention desire information, traffic information, location information, usage information on things, and the like may be obtained. To this end, a human body communication technology may be applied.

Human body communication technology is a technology for transmitting information through the human body through the contact of the human body. Therefore, the communication is made with high security and through human contact, and the therefore is an intuitive communication technology that does not require a complicated connection procedure. That is, the human body communication is a technology that can transmit and receive data only by a body contact. To apply the human body communication, basically, various kinds of things, devices, machines, and tags to which a transmitting and receiving function for human body communication is applied should be created newly.

For example, when a user's body wearing a reader contacts a target thing including a tag, the human body communication device may cause the reader to receive tag information using the human body as a communication medium. In this case, the reader should be made in a form including a human body communication receiving function and can be implemented in the form of a wearable devices such as a bracelet, a watch, and a smartphone that can be worn or carried on the human body. The tag should be made in a form that includes a human body communication transmission function.

Korean Patent No. 10-0942706 (2010 Feb. 9) relates to a radio frequency identification system using human body communication. The radio frequency identification system using human body communication includes: a first electrode pad configured to receive a signal of a reader transmitted through a human body or output an output signal to the human body; a rectifier configured to rectify the signal of the reader to generate a DC voltage; a power manager configured to convert the DC voltage into an operating voltage; a modulator/demodulator configured to demodulate the signal of the reader or modulate an output signal of a tag to transmit and transmit the modulated output signal to the first electrode pad; a digital controller configured to perform a read or write operation in response to the signal of the reader demodulated by the modulator/demodulator; and a memory configured to store identification information on the tag and information according to an operation result of the digital controller, thereby making it possible to identify tag information or transmit data only by approaching or contacting a part of the human body.

Korean Patent No. 10-0912585 (2009 Aug. 10) relates to a tag apparatus, an antenna, and a portable card. The tag apparatus performing wireless communication includes: main loop portion configured to transmit and receive a radio wave, with the main loop portion being loop-shaped metal foils which are mounted to go round a surface and side surfaces of a dielectric substrate, having a dielectric substrate interposed therebetween; an antenna portion configured to include a capacitive load portion which has a load of a capacitance component, with the antenna portion being a metal foil connected to the main loop portion; and a controller configured to be connected to the main loop portion and control information through the radio wave.

RELATED ART DOCUMENT

Patent Document

Korean Patent No. 10-0942706 (2010 Feb. 9)
Korean Patent No. 10-0912585 (2009 Aug. 10)

SUMMARY

The present disclosure provides a tag apparatus for attaching things based on human body communication capable of detecting a contact of a human body by simply attaching a tag to the things regardless of types sizes shapes areas and the like of the existing things and automatically collecting behavior situation information on contacted things by transmitting identification information on the things through human body communication as soon as a user's body contacts tag attachment portions of things.

The present disclosure also provides a tag apparatus for attaching things based on human body communication capable of collecting information on a thing that a user contacts by transmitting information on a thing stored in a tag to the user through a human body as soon as the user contacts the tag attached to the thing.

The present disclosure also provides a tag apparatus for attaching things based on human body communication that can be manufactured in a small size in a form which can be detached from a surface of a thing according to a shape of the existing thing without changing and replacing the existing thing instead of making new things, devices, machines, tags, and the like and can detect whether to contact the thing according to whether to use the thing.

In an aspect, a tag apparatus for attaching things based on human body communication includes: a tag main body for human body communication configured to be attached to a thing to transmit identification information on a thing to a human body communication receiving device through human body communication during the contact of the human body with the thing; a case configured to protect the tag main body for human body communication; and a thing attachment portion configured to be exposed to an outside of the case to be attached to a particular part of the thing, detect when the human body contacts or approaches the thing, and forms a human body communication channel to output identification information on the thing.

The tag apparatus for attaching things based on human body communication may further include a ground extension configured to be exposed to the outside of the case and extend a ground of the tag main body for human body communication.

The tag main body for human body communication may include: a sensor extension configured to be electrically connected to the sensor, exposed to the outside of the case to be disposed on the thing attachment portion, and formed of a conductor or conductive fiber in a form of a flexible printed circuit board (FPCB) to expand a sensing range of the sensor; a human body communication transmitter configured to transmit identification information on the thing when the contact or approach of the human body is detected through the sensor and the sensor extension; and a human body communication electrode configured to be electrically connected to the human body communication transmitter and arranged side by side with the sensor extension part in the thing attachment portion to make the contact or approach of the human body simultaneously with the sensor extension to form a human body communication channel with the human body communication receiving device, and the sensor extension and the human body communication electrode may be electrically connected to one side of the printed circuit board (PCB) of the tag main body for human body communication and arranged side by side along a longitudinal direction of the thing attachment portion.

The tag main body for human body communication may estimate a contact state of the human body when the contact of the human body is detected by the sensor and the sensor extension, and transmit additional information corresponding to the estimated state together with the identification information on the thing to the human body communication receiver through the human body communication transmitter and the human body electrode.

The tag main body for human body communication may estimate a user's state based on a context including at least one of a momentum at which a thing moves, pressure applied to a thing, temperature, humidity, and illuminance which are detected according to a sensor type of the sensor during the contact of the human body, and provide, as additional information, a service profile including at least one available conditional service content providing the contacted thing information to the user according to the estimated user's state.

The tag main body for human body communication may be attached or reattached to the surface of the thing using a double-sided tape.

The case may be configured to enclose the tag main body for human body communication and is electrically connected to a PCB of the tag main body for human body communication by forming a part or all of the case with a conductive material or coating a part or all of the case with the conductive material.

The thing attachment portion may be attached along the surface of the thing and configured to have different lengths, different widths, and different designs according to the form of the surface of the thing to be attached.

DETAILED DESCRIPTION

Figure 1:
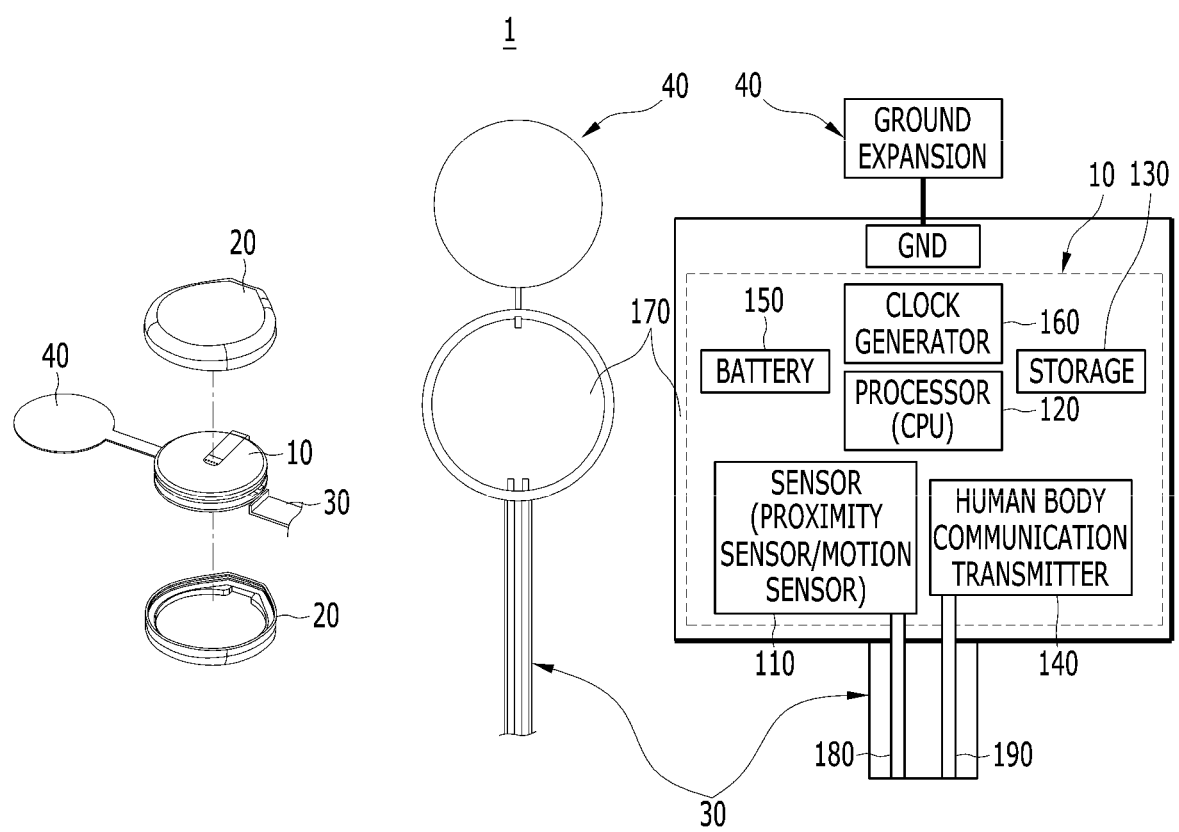
FIG. 1 is a diagram illustrating a tag apparatus for attaching things based on human body communication according to an embodiment of the present disclosure.

Description of the present disclosure is only an embodiment for structural or functional description, and therefore the scope of the present disclosure should not be construed as limited to embodiments described in the text. That is, since the embodiments may be variously modified and may have various forms, the scope of the present disclosure should be construed as including equivalents capable of realizing the technical idea. In addition, a specific embodiment is not construed as including all the objects or effects presented in the present disclosure or only the effects, and therefore the scope of the present disclosure should not be understood as being limited thereto.

On the other hand, the meaning of the terms described in the present application should be understood as follows.

Terms such as "first" and "second" are intended to distinguish one component from another component, and the scope of the present disclosure should not be limited by these terms. For example, a first component may be named a second component and the second component may also be similarly named the first component.

It is to be understood that when one element is referred to as being "connected to" another element, it may be connected directly to or coupled directly to another element or be connected to another element, having the other element intervening therebetween. On the other hand, it is to be understood that when one element is referred to as being "connected directly to" another element, it may be connected to or coupled to another element without the other element intervening therebetween. Meanwhile, other expressions describing a relationship between components, that is, "between", "directly between", "neighboring to", "directly neighboring to" and the like, should be similarly interpreted.

It should be understood that the singular expression include the plural expression unless the context clearly indicates otherwise, and it will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

In each step, an identification code (for example, a, b, c, and the like) is used for convenience of description, and the identification code does not describe the order of each step, and each step may be different from the specified order unless the context clearly indicates a particular order. That is, the respective steps may be performed in the same sequence as the described sequence, be performed at substantially the same time, or be performed in an opposite sequence to the described sequence.

The present disclosure can be embodied as computer readable code on a computer readable recording medium, and the computer readable recording medium includes all types of recording devices in which data can be read by a computer system. Examples of the computer readable recording medium may include a read only memory (ROM), a random access memory (RAM), a compact disk read only memory (CD-ROM), a magnetic tape, a floppy disk, an optical data storage, or the like. In addition, the computer readable recording medium may be distributed in computer systems connected to each other through a network, such that the computer readable codes may be stored and executed in the computer readable recording media in a distributed scheme.

Unless defined otherwise, all the terms used herein including technical and scientific terms have the same meaning as meanings generally understood by those skilled in the art to which the present disclosure pertains. It should be understood that the terms defined by the dictionary are identical with the meanings within the context of the related art, and they should not be ideally or excessively formally defined unless the context clearly dictates otherwise.

FIG. 1 is a diagram illustrating a tag apparatus for attaching things based on human body communication according to an embodiment of the present disclosure.

Referring to FIG. 1, the tag apparatus for attaching things based on human body communication 1 includes a tag main body for human body communication 10, a case 20, a thing attachment portion 30, and an expansion ground part 40.

The tag main body for human body communication 10 may transmit identification information on a thing contacting a human body to a human body communication receiving device. In one embodiment, the tag main body for human body communication 10 is configured to include a sensor 110, a processor 120, a storage 130, a human body communication transmitter 140, a battery 150, and a clock generator 160, and these components may be mounted on a printed circuit board (PCB) 170 to be electrically connected thereto. In one embodiment, the tag main body for human body communication 10 is configured to include a sensor extension 180 and a human body communication electrode 190, and these component parts are arranged side by side in the thing attachment portion 30 and then exposed to the outside of the case 20, so a part of the human body may be attached to the existing thing so as to be in contact with the thing attachment portion 30.

The sensor 110 may detect the contact state of the human body. In one embodiment, the sensor 110 may be implemented by various sensors such as a pressure sensor, a temperature sensor, a motion sensor, a proximity sensor to detect the contact of the human body by sensing pressure, temperature, motion, and the like. In one embodiment, the sensor 110 may detect the contact of the human body by sensing an approach of a person through a proximity sensor that detects the approach or contact when a person is approached by a predetermined distance or more. Here, the sensor 110 may be connected to the sensor extension 180 to extend the sensing portion of the human body contact.

When the sensor 110 detects the contact of the human body, the processor 120 may perform a process suitable for a contact state. In one embodiment, the processor 120 may estimate a user's state based on a context including at least one of momentum, pressure, temperature, humidity, illuminance, and the like which may be detected according to a sensor type of the sensor 110, and may determine at least one available condition that may provide the information on the contacted thing to the user according to the estimated user's state.

The storage 130 may store additional information together with thing identification information or a unique number that can identify the contacted thing. Here, the additional information may refer to a service profile including at least one available conditional service content that the thing can provide to the user. Therefore, meaningful service contents can be provided to the user at the moment of the contact with the thing. Here, the thing identification information may mean to which thing a tag is attached (thing information), who and when produced a tag (production information), and what tags are used for each type of things, and the like. The additional information may refer to a count indicating a contact frequency of a user without wearing a wearable device that is a human body communication receiver or a value sensed by a temperature or humidity sensor. The identification information may include a type of thing, a type of thing, and the like.

The human body communication transmitter 140 may transmit the thing identification information and the additional information to the human body communication receiving device through the human body communication electrode 190.

The battery 150 may refer to a battery for supplying operating power to the tag main body for human body communication 10.

The clock generator 160 is supplied with an operating voltage from the battery 150 and generates and provides an operating clock signal of each component.

The sensor extension 180 may be connected to the sensor 110 and disposed to extend in a longitudinal direction of the thing attachment portion 30 to extend a sensing range of the contact of the human body. In one embodiment, the sensor extension 180 may sense the contact of the human body and transmit a sensing signal to the sensor 110.

The human body communication electrode 190 may be connected to the human body communication transmitter 140 and form the human body communication channel with the human body communication receiving device to output the thing identification information and the additional information transmitted from the human body communication transmitter 140 to the human body. In one embodiment, the human body communication electrode 190 may be disposed in parallel with the sensor extension 180 in the thing attachment portion 30 to simultaneously detect the contact of the human body and form the human body communication channel during the contact of the human body.

The case 20 may include an upper case and a lower case and may serve to protect the tag main body for human body communication (10) by being installed to enclose the tag main body for human body communication 10 as a whole. In one embodiment, the case 20 may be made of polycarbonate (PC), ABS, silicone, rubber, and the like, and may be simply attached to the surface of an existing thing. In this case, the case 20 may be made of or coated (painted) with some or all of the conductive materials to be electrically connected to the PCB 170 of the tag main body for human body communication 10.

The thing attachment portion 30 is exposed to the outside of the case 20 to extend the attachment portion to the thing, and the sensor extension 180 and the human body communication electrode 190 are arranged side by side. In one embodiment, the thing attachment portion 30 may be attached along the surface of the thing regardless of the size, shape, area, and the like of the existing thing, and may be implemented in an FPCB form having various lengths, various widths, and various designs or a thin film strip form according to the surface form of the thing to be attached.

The ground extension 40 may extend a ground GND of the PCB 170 of the tag main body for human body communication 10 according to the human body communication transmission performance.

Figure 2:
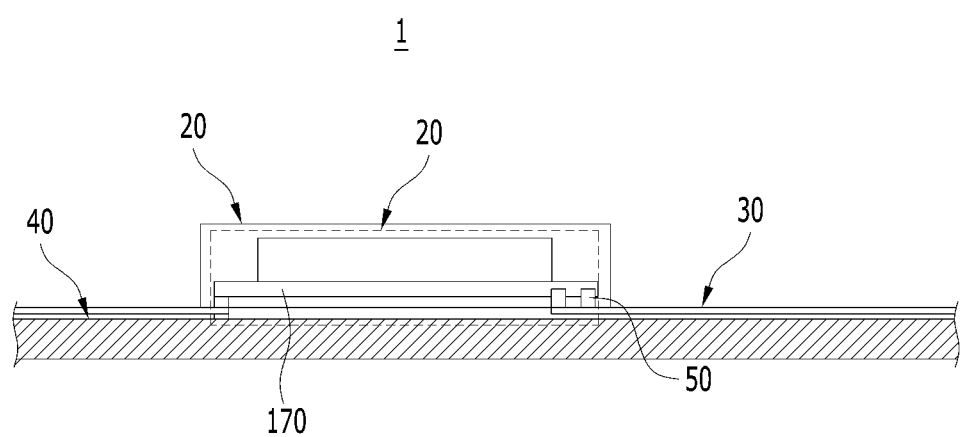
FIG. 2 is a cross-sectional view illustrating an arrangement structure of the tag apparatus for attaching things based on human body communication in FIG. 1.

FIG. 2 is a cross-sectional view illustrating an arrangement structure of the tag apparatus for attaching things based on human body communication in FIG. 1.

Referring to FIG. 2, a tag apparatus for attaching things based on human body communication 1 may be configured to include a tag main body for human body communication 10, a case 20 enclosing and protecting the tag main body for human body communication 10, a thing attachment portion 30, and a ground extension 40.

The tag apparatus for attaching things based on human body communication 1 is attached to a surface of a thing. In this case, the tag apparatus for attaching things based on human body communication 1 may be attached or reattached to the surface of the thing using a double-sided tape and the like. In one embodiment, the tag apparatus for attaching things based on human body communication 1 may be attached to a site where a user mainly contacts various things. For example, in the case of a refrigerator, the tag apparatus for attaching things based on human body communication 1 may be attached to a handle portion of the refrigerator.

The tag apparatus for attaching things based on human body communication 1 includes the case 20 attached to the surface of the thing and the tag main body for human body communication 10 installed inside the case 20. The tag main body for human body communication 10 includes a battery 150 mounted on one surface of a PCB 170, and a sensor 110, a processor 120, a storage 130, a human body communication transmitter 140, and a clock generator 160 on another surface of the PCB 170. In this case, components mounted on the PCB 170 may be supplied with operating power through the battery 150.

In the tag apparatus for attaching things based on human body communication 1, the thing attachment portion 30 is electrically connected to the tag main body for human body communication 10, and is extended and attached to a part that the thing contacts. In the thing attachment portion 30, the sensor extension 180 and the human body communication electrode 190 are arranged side by side.

In the tag apparatus for attaching things based on human body communication 1, the ground extension 40 may be electrically connected to one side of the PCB 170 through the connector 50, and the sensor extension 180 and the human body communication electrode may be electrically connected to the other side thereof. In this case, the sensor extension 180 may be selectively included according to the type of the sensor 110. Here, the ground extension 40, the sensor extension 180, and the human body communication electrode 190 may be implemented in the form of a thin film flexible printed circuit board (FPCB). The ground extension 40 may be attached to the surface of the thing or disposed on an upper part, a lower part, or sides of the case 20 to extend the ground GND of the PCB 170. The sensor extension 180 and the human body communication electrode 190 may be extended and attached along a surface and a line contacting the human body.

Figure 3:
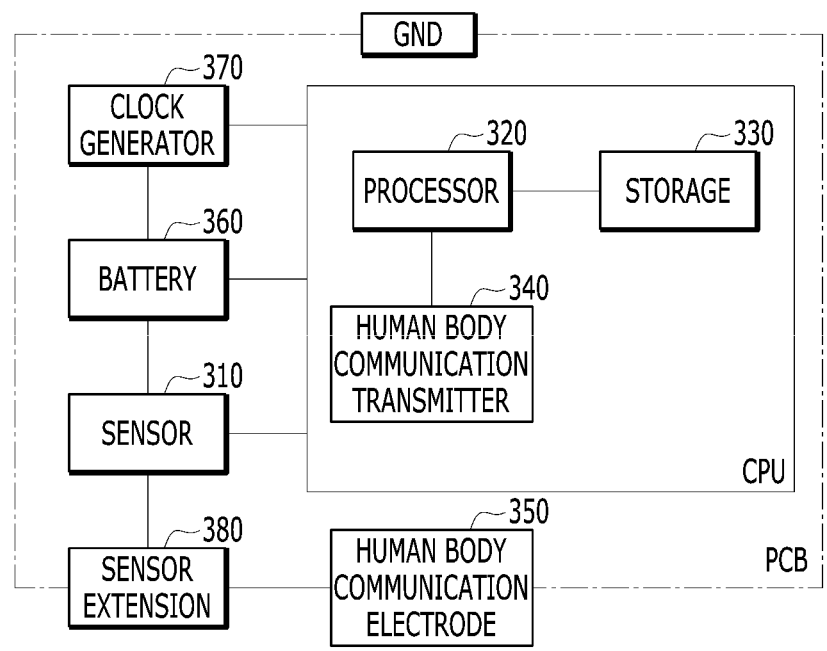
FIG. 3 is a configuration diagram illustrating a tag main body for human body communication in FIG. 1.

FIG. 3 is a configuration diagram illustrating a tag main body for human body communication in FIG. 1.

Referring to FIG. 3, a tag main body for human body communication 10 is configured to include a sensor 310, a processor 320, a storage 330, a human body communication transmitter 340, a human body communication electrode 350, a battery 360, a clock generator 370, and a sensor extension on a PCB.

The sensor 310 may detect the approach or contact state of the human body. In one embodiment, the sensor 310 may transmit a contact detection signal to the processor 320 when the human body approaches or contacts the thing. Here, the contact detection signal may wake up the processor 320. The sensor expansion 380 disposed to be exposed to the outside of the case 20 is electrically connected to the sensor 310. The sensor extension 380 may be implemented with an electrically conductive conductor or a conductive fiber in the FPCB form, and may extend the sensing range of the sensor 310 to facilitate the contact of the user with the thing.

The processor 320 performs control to receive and operate a contact detection signal, estimate a contact state from the contact detection signal, store any information obtained in the process in the storage 330 or read the additional information according to the estimated state together with the identification information on the thing from the storage 330, and transmit the information to the human body communication transmitter 340.

For example, when the sensor 310 is a motion sensor, the processor 320 may process the contact detection signal with a momentum value when the user moves the thing during the contact of the human body with the thing. When the sensor 310 is a pressure sensor, the processor 320 may process the contact detection signal with a value of pressure applied to a thing during the contact of the user' body with the thing.

In one embodiment, the processor 320 may be implemented as a central processing unit (CPU) called a central processing device. In this case, the storage 330 and the human body communication transmitter 340 may be included in a configuration embedded in the CPU.

The storage 330 may store information transmitted to the human body communication receiving device during the contact process of the human body. In one embodiment, the storage 330 may store the identification information on the thing, including a type, a manufacturing history, a contact frequency, and a contact time of the thing.

The human body communication transmitter 340 may output the sensor data processed from the contact detection signal in the processor 320 together with the identification information on the thing through the human body electrode 350. Here, the sensor data may include a momentum value, brightness, temperature, humidity, and the like.

The human body communication electrode 350 is electrically connected to the user's body to form a communication channel, and outputs the identification information and sensor data of the thing transmitted from the human body communication transmitter 340 to a wearable device that is a human body communication receiving device including a human body communication receiving function that a user wears.

The battery 360 supplies operating power to each component of the tag main body for human body communication 10.

The clock generator 370 is supplied with operating power from the battery 360, generates a clock, and provides the clock to a CPU including a processor 320, a storage 330, and a human body communication transmitter 340.

Figure 4:
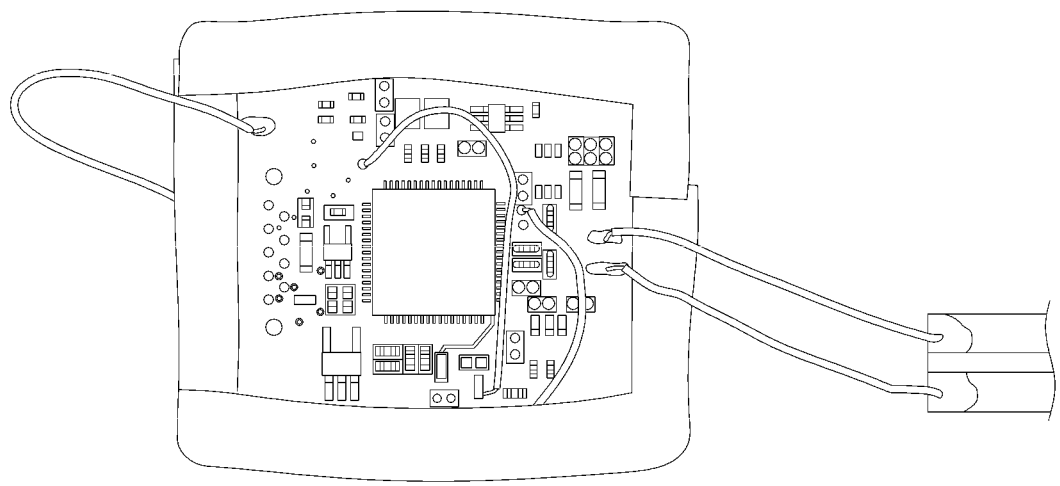
FIG. 4 is a photograph of a product showing a PCB mounting form of a tag main body for human body communication in FIG. 1.

FIG. 4 is a photograph of a product showing a PCB mounting form of a tag main body for human body communication in FIG. 1.

Referring to FIG. 4, components constituting the tag main body for human body communication 10 may be mounted on the PCB 170 and manufactured in a small size. Among the components constituting the tag main body for human body communication 10, one end of the sensor extension 180 and one end of the human body communication electrode 190 is exposed to the outside of the case 20 while being connected to the PCB 170 and extended in the FPCB form, and thus may be manufactured in the form of the thing attachment portion 30 that the human body may easily approach or contact and may be simply attached to the thing. In one embodiment, the PCB 170 of the tag main body for human body communication 10 may be manufactured in a circular or quadrangular shape, but is not limited thereto, and may be manufactured according to a size, a shape or the like of the thing.

Figure 5A:
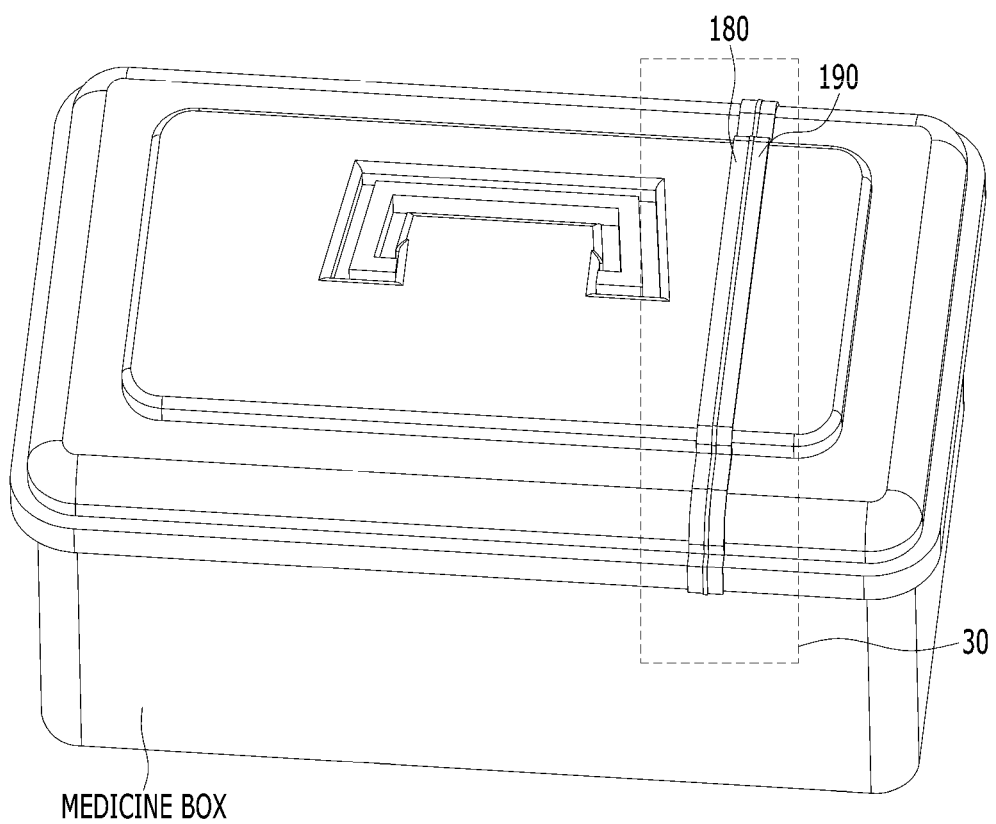
FIGS. 5A and 5B are exemplary views illustrating a form in which the tag apparatus for attaching things based on human body communication according to an embodiment is attached to a medicine box.
Figure 5B:
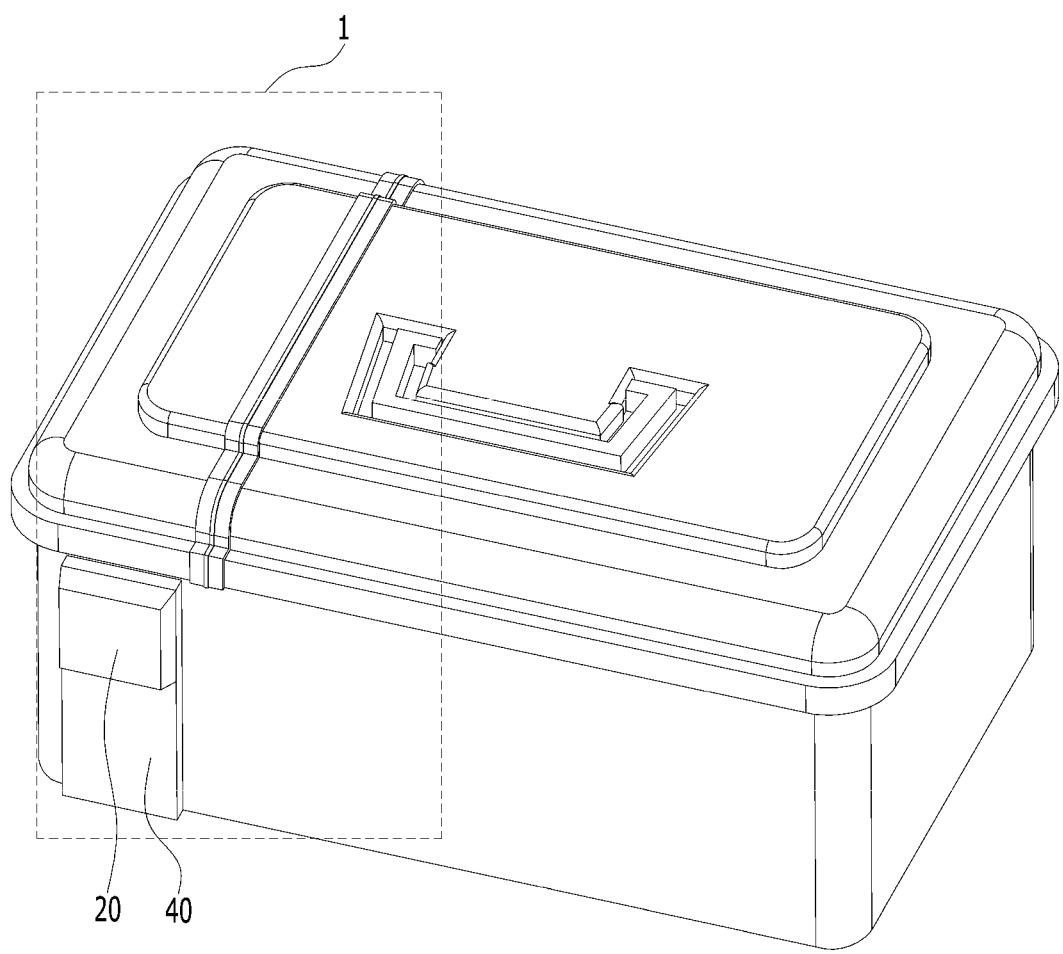

FIGS. 5A and 5B are exemplary diagrams illustrating a form in which a tag apparatus for attachment of things human body communication according to an embodiment is attached to a medicine box, in which FIGS. 5A and 5B each illustrates front and rear portions of the existing medicine box attached to the tag apparatus for attaching things based on human body communication 1 according to an embodiment.

Referring to FIGS. 5A and 5B, the thing attachment portion 30 is attached to a particular part of the medicine box that the user's hand mainly contacts when using the medicine box, for example, a front surface of the medicine box, and the case 20 and the ground extension 40 may be attached to a back surface of the medicine box. The sensor extension 180 and the human body communication electrode 190 are arranged side by side in the thing attachment portion 30, and the user's body simultaneously contacts the sensor extension 180 and the human body communication electrode 190 when contacting the thing, so the human body contact can be detected and the human body communication channel can be formed.

Figure 6A:
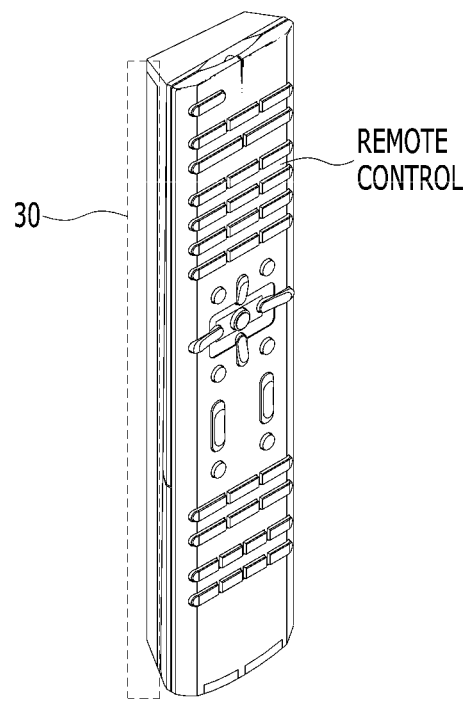
FIGS. 6A and 6B are exemplary diagrams illustrating a form in which the tag apparatus for attaching things based on human body communication according to an embodiment is attached to a remote control.
Figure 6B:
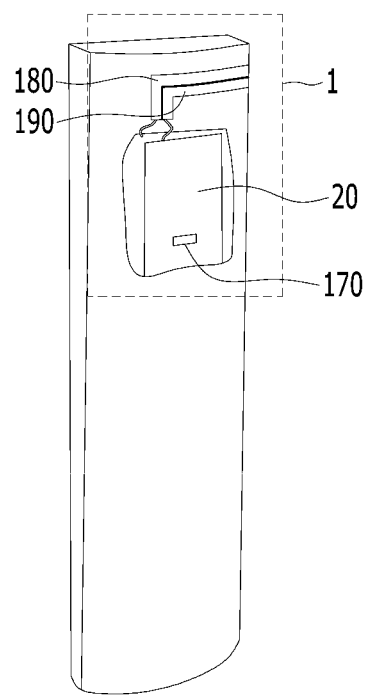

FIGS. 6A and 6B are exemplary diagrams illustrating a form in which a tag apparatus for attachment of things human body communication according to an embodiment is attached to a remote control, in which FIGS. 6A and 6B each illustrates front and rear portions of the existing remote control attached to the tag apparatus for attaching things based on human body communication 1 according to an embodiment.

Referring to FIGS. 6A and 6B, the thing attachment portion 30 may be attached to a particular part of the remote control that a user's hand mainly contacts when using the remote control, for example, at least one of both side surfaces of the remote control contacted when the user holds the remote control by hand along a longitudinal direction thereof, and the case 20 including the tag main body for human body communication 10 may be attached to a back surface of the remote control. In this case, the sensor extension 180 and the human body communication electrode 190 exposed to the outside of the case 20 and electrically connected to one end of the PCB 170 of the tag main body for human body communication 10 mounted inside the case 20 are arranged side by side in thing attachment portion 30, thereby making it possible to detect the contact of the human body when the user contacts the thing attachment portion 30 attached to the remote control and automatically transmit the information informing that the contacted thing is the remote control as soon as the user contacts the remote control to the human body communication receiver through the user's body.

According to an embodiment, the tag apparatus for attaching things based on human body communication may be attached to surfaces of any things, such as a door handle, a refrigerator handle, or a toilet seat, detect the approach or contact of the human body using the sensor, save the battery by using the contact detection signal as a wake-up signal, and automatically transmit the identification information and the sensor data unique to the things through the human body communication during the contact of the human body to the things.

While the present disclosure has been shown and described in connection with the embodiments, it will be apparent to those skilled in the art that modifications and variations can be made without departing from the spirit and scope of the disclosure as defined by the appended claims.

The disclosed technique can have the following effects. However, since a specific embodiment is not construed as including all of the following effects or only the following effects, it should not be understood that the scope of the disclosed technology is limited to the specific embodiment.

The tag apparatus for attaching things based on human body communication according to the embodiment of the present disclosure can immediately figure out whether the user uses the thing only by simply attaching the tag to the thing without any new development, additional development, modification of the existing thing, thereby making it possible to provide an opportunity to find the user's space movement, the life behavior pattern, the thing movement pattern, and the like. As a result, new services can be quickly and diversely created in various fields such as single senior care and home healthcare.

The tag apparatus for attaching things based on human body communication according to the embodiment of the present disclosure can change the length, width, and design of the portion attached to the surface of the thing that the user mainly contacts, so that it is possible to easily detect the contact of the user's body by easily detaching the tag regardless of the size, shape, area or the like of existing thing.

In the tag apparatus for attaching things based on human body communication according to the embodiment of the present disclosure, the contact detection of the human body and the formation of the human body communication channel may be simultaneously performed during the contact process of the human body.

What is claimed is:

1. A tag apparatus for attaching things based on human body communication, comprising:
   a tag main body for human body communication configured to be attached to a thing to transmit identification information on the thing to a human body communication receiving device through human body communication during a contact of the human body with the thing;
   a case configured to protect the tag main body for human body communication; and
   a thing attachment portion configured to be exposed to an outside of the case to be attached to a particular part of the thing, detect when the human body contacts or approaches the thing, and forms a human body communication channel to output identification information on the thing,
   wherein the tag main body for human body communication includes:
      a sensor configured to detect the contact or approach of the human body to the thing; and
      a sensor extension configured to be connected to the sensor and exposed to the outside of the case to expand a sensing range of the sensor, wherein the tag main body for human body communication includes:
a human body communication transmitter configured to transmit identification information on the thing when the contact or approach of the human body is detected through the sensor and the sensor extension; and
a human body communication electrode configured to be electrically connected to the human body communication transmitter and arranged side by side with the sensor extension in the thing attachment portion to make the contact or approach of the human body simultaneously with the sensor extension to form a human body communication channel with the human body communication receiving device,
wherein the sensor extension and the human body communication electrode are electrically connected to one side of a printed circuit board (PCB) of the tag main body for human body communication and arranged side by side along a longitudinal direction of the thing attachment portion.

2. The tag apparatus for attaching things based on human body communication of claim 1, wherein the tag main body for human body communication estimates a contact state of the human body when the contact of the human body is detected by the sensor and the sensor extension, and transmits additional information corresponding to the estimated state together with the identification information on the thing to the human body communication receiving device through the human body communication transmitter and the human body electrode.

3. The tag apparatus for attaching things based on human body communication of claim 2, wherein the tag main body for human body communication estimates a user's state based on a context including at least one of a momentum at which the thing moves, pressure applied to the thing, temperature, humidity, and illuminance which are detected according to a sensor type of the sensor during the contact of the human body, and provides, as additional information, a service profile including at least one available conditional service content providing the contacted thing information to the user according to the estimated user's state.

4. The tag apparatus for attaching things based on human body communication of claim 1, wherein the case is configured to enclose the tag main body for human body communication and is electrically connected to the PCB of the tag main body for human body communication by forming a part or all of the case with a conductive material or coating a part or all of the case with the conductive material.

* * * * *